United States Patent
Wu et al.

(10) Patent No.: US 11,431,251 B2
(45) Date of Patent: Aug. 30, 2022

(54) POWER CONVERTER, SYNCHRONOUS POWER CONVERTER SYSTEM AND METHOD OF DETERMINING SWITCHING FREQUENCY

(71) Applicant: ANPEC ELECTRONICS CORPORATION, Hsinchu (TW)

(72) Inventors: Tse-Hsu Wu, Hsinchu (TW); Yun-Chiang Chang, Hsinchu (TW); Fu-Chuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 99 days.

(21) Appl. No.: 17/160,382

(22) Filed: Jan. 28, 2021

(65) Prior Publication Data

US 2022/0123656 A1 Apr. 21, 2022

(30) Foreign Application Priority Data

Oct. 15, 2020 (TW) .................................. 109135743

(51) Int. Cl.
*H02M 3/157* (2006.01)
*H02M 3/158* (2006.01)
*H02M 1/00* (2006.01)

(52) U.S. Cl.
CPC ........... *H02M 3/1588* (2013.01); *H02M 1/00* (2013.01); *H02M 3/157* (2013.01); *H02M 1/0041* (2021.05)

(58) Field of Classification Search
CPC ...... H02M 3/1588; H02M 1/00; H02M 3/157; H02M 1/0041
See application file for complete search history.

(56) References Cited

U.S. PATENT DOCUMENTS

| | | | |
|---|---|---|---|
| 10,637,354 B1* | 4/2020 | Wu | H02M 1/44 |
| 2021/0203238 A1* | 7/2021 | Wu | H02M 3/1588 |

\* cited by examiner

*Primary Examiner* — Adolf D Berhane
(74) *Attorney, Agent, or Firm* — Li & Cai Intellectual Property Office

(57) ABSTRACT

A power converter, a synchronous power converter system and a method of determining switching frequency are provided. A processor is configured to output a synchronous clock signal corresponding to a first switching frequency. A plurality of first-stage power converters are coupled to the processor, and configured to generate a plurality of first output voltages corresponding to the first switching frequency according to the synchronous clock signal and a system voltage. At least one second-stage power converter is coupled to the processor and one of the plurality of first-stage power converters, and configured to generate a second output voltage corresponding to a second switching frequency according to the synchronous clock signal, a multiplied frequency control signal and one of the plurality of first output voltages. The second switching frequency is a multiple of the first switching frequency.

16 Claims, 8 Drawing Sheets

POWER CONVERTER, SYNCHRONOUS POWER CONVERTER SYSTEM AND METHOD OF DETERMINING SWITCHING FREQUENCY

CROSS-REFERENCE TO RELATED PATENT APPLICATION

This application claims the benefit of priority to Taiwan Patent Application No. 109135743, filed on Oct. 15, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, a synchronous power converter system and a method thereof, and more particularly to a power converter, a synchronous power converter system and a method thereof capable of determining a switching frequency of the power converter.

BACKGROUND OF THE DISCLOSURE

FIG. 1 is a functional block diagram of a conventional synchronous power converter system 1. The synchronous power converter system 1 is utilized in a computer system, and a circuit architecture of the synchronous power converter system 1 is shown in FIG. 1. A plurality of power converters 101, 103 and 104 generate a plurality of output voltages V11 (e.g., 5 volts), V12 (e.g., 3.3 volts), V13 (e.g., 1.8 volts), V14 (e.g., 1.2 volts) and V15 (e.g., 1 volt), respectively, according to a system voltage VIN (e.g., 12 volts) and a synchronous clock signal SYNC to a plurality of circuit elements of the computer system. The power converter 102 generates an output voltage V2' (e.g., 0.8 volts) according to the system voltage VIN and the synchronous clock signal SYNC to a processor 12 of the computer system. If a switching frequency Fsync corresponding to a typical synchronous clock signal SYNC is 600 kHz, and a switching frequency Fsync corresponding to the synchronous clock signal SYNC is 2.4 MHz, the output voltage V2' having the characteristics (such as a voltage ripple, a duty cycle, and a transient speed, etc.) allows the processor 12 to operate with favorable performance.

Therefore, the processor 12 cannot operate with favorable performance when all the power converters of the synchronous power converter system 1 perform power conversion according to the switching frequency Fsync of the synchronous clock signal SYNC being 600 kHz, which leads to a bad user experience. On the other hand, an overall performance of the computer system degrades when all the power converters of the synchronous power converter system 1 perform power conversion according to the switching frequency Fsync of the synchronous clock signal SYNC being 2.4 MHz. In addition, a default minimum on-time(s) is set to the power converters 101, 102, 103 and 104 to ensure the characteristics of the output voltages provided by the power converters 101, 102, 103 and 104 can meet application requirements. However, the power converters 103 and 104 that are configured to generate low output voltages such as the output voltages V13 (e.g., 1.8 volts), V14 (e.g., 1.2 volts) and V15 (e.g., 1 volt) cannot operate normally when all the power converters of the synchronous power converter system 1 perform power conversion according to the switching frequency Fsync of the synchronous clock signal SYNC being 2.4 MHz, because the rapid switching frequency Fsync of 2.4 MHz causes on-times of duty cycles of the low output voltages such as V13, V14 and V15 to be lower than the default minimum on-time(s).

Therefore, how the synchronous power converter system can be designed to improve the overall performance of the computer system has become an issue to be addressed in the industry.

SUMMARY OF THE DISCLOSURE

In response to the above-referenced technical inadequacies, the present disclosure provides a synchronous power converter system, a power converter, and a method of determining a switching frequency.

In one aspect, the present disclosure provides a synchronous power converter system including a processor, a plurality of first-stage power converters and at least one second-stage power converter. The processor is configured to output a synchronous clock signal corresponding to a first switching frequency. The plurality of first-stage power converters are coupled to the processor, and configured to generate a plurality of first output voltages corresponding to the first switching frequency according to the synchronous clock signal and a system voltage. The at least one second-stage power converter is coupled to the processor and one of the plurality of first-stage power converters, and configured to generate a second output voltage corresponding to a second switching frequency according to the synchronous clock signal, a multiplied frequency control signal, and one of the plurality of first output voltages, in which the second switching frequency is a multiple of the first switching frequency.

In another aspect, the present disclosure provides a power converter utilized in a synchronous power converter system including a processor. The processor is configured to output a synchronous clock signal corresponding to a first switching frequency. The power converter includes a multiplied frequency control circuit and a switch control circuit. The multiplied frequency control circuit is configured to generate a switch control signal corresponding to a second switching frequency according to a multiplied frequency control signal and the synchronous clock signal, in which the multiplied frequency control signal indicates a multiple between the second switching frequency and the first switching frequency. The switch control circuit is coupled to the multiplied frequency control circuit, and configured to control the power converter to generate an output voltage corresponding to the second switching frequency according to the switch control signal.

In another aspect, the present disclosure provides a method of determining a switching frequency, and the method is utilized in a synchronous power converter system including a first-stage power converter and at least one second-stage power converter. The method includes: determining whether or not a synchronous clock signal corresponding to a first switching frequency is received by the first-stage power converter and the at least one second-stage power converter; determining whether or not a multiplied frequency control signal indicating a multiple between a second switching frequency and the first switching frequency is received by the at least one second-stage power converter when the synchronous clock signal is received by the first-stage power converter and the at least one second-stage power converter; and performing voltage conversion by the at least one second-stage power converter according to the second switching frequency when the multiplied frequency control signal is received by the at least one second-stage power converter, in which the second switching frequency is a multiple of the first switching frequency.

Therefore, by virtue of "a two-stage power conversion architecture", the synchronous power converter system of the present disclosure allows the power converters to operate with a proper switching frequency (e.g., a first switching frequency or a second switching frequency), such that a supplied voltage having proper characteristics can be provided to different elements in a computer system, so as to improve an overall performance of the computer system.

Further, by virtue of "adding a multiplied frequency control circuit in the second-stage power converter", the second-stage power converter can determine a switching frequency (e.g., a first switching frequency Fsync, a multiple of the first switching frequency Fsync, or the oscillating switching frequency Fosc) corresponding to a switch control signal, thereby adjusting characteristics of the output voltage that is generated by the second-stage power converter, so the processor can operate with various performances to meet application requirements correspondingly.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
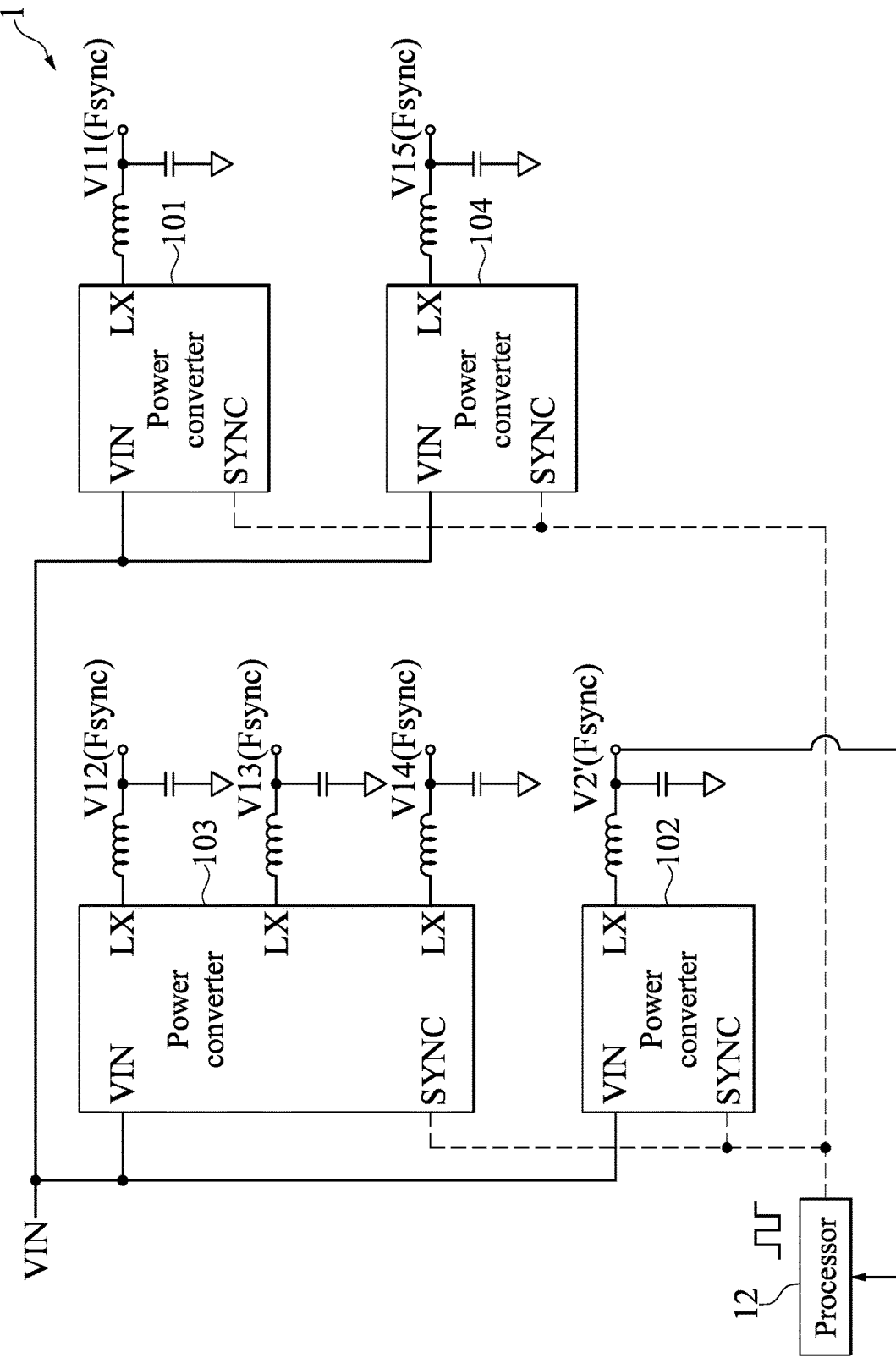
FIG. 1 is a functional block diagram of a conventional synchronous power converter system.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
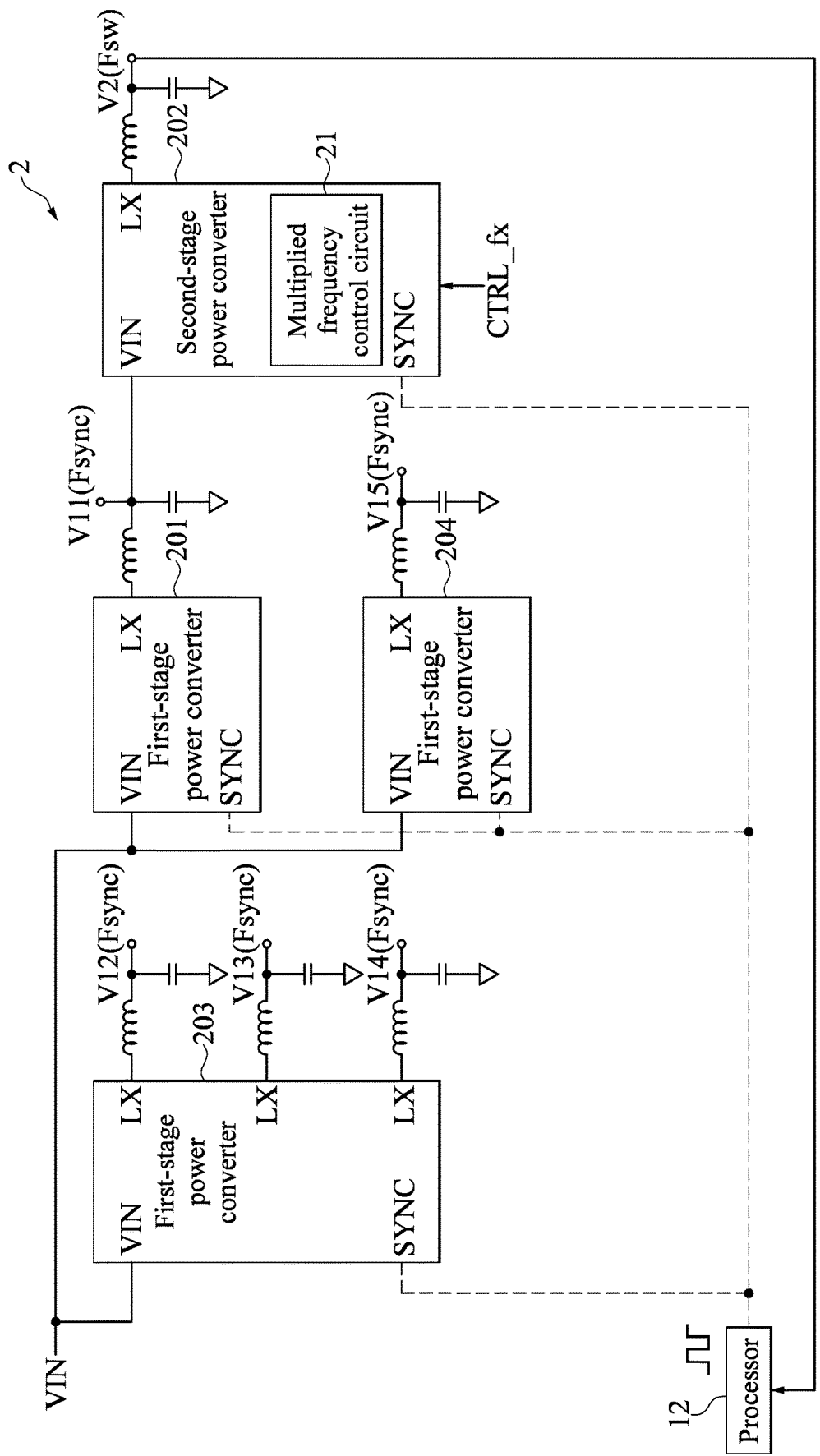
FIG. 2 is a functional block diagram of a synchronous power converter system according to a first embodiment of the present disclosure.

FIG. 2 is a functional block diagram of a synchronous power converter system 2 according to a first embodiment of the present disclosure. The synchronous power converter system 2 includes a processor 12, a plurality of first-stage power converters 201, 203 and 204, and a second-stage power converter 202. The processor 12 may be a central processing unit (CPU) of a computer system (e.g., a desktop computer, a notebook computer, a tablet computer or a smartphone), and configured to output a synchronous clock signal SYNC corresponding to a first switching frequency Fsync to the plurality of first-stage power converters 201, 203 and 204 and the second-stage power converter 202. The plurality of first-stage power converters 201, 203 and 204 are coupled to the processor 12, and configured to generate a plurality of first output voltages V11, V12, V13, V14 and V15 corresponding to the first switching frequency Fsync at an output terminal LX according to the synchronous clock signal SYNC and a system voltage VIN, in order to respectively drive a plurality of elements in the computer system. In one embodiment, the first-stage power converters 201, 203 and 204 and the second-stage power converter 202 may be a buck power converter (i.e., buck DC-to-DC power converter). The first-stage power converter 201 is configured to generate the first output voltage V11 corresponding to the first switching frequency Fsync at the output terminal LX according to the synchronous clock signal SYNC and the system voltage VIN. The first-stage power converter 203 may be a triple buck converter, and configured to generate the plurality of first output voltages V12, V13 and V14 corresponding to the first switching frequency Fsync at the output terminal LX according to the synchronous clock signal SYNC and the system voltage VIN. The first-stage power converter 204 is configured to generate the first output voltage V15 corresponding to the first switching frequency Fsync at the output terminal LX according to the synchronous clock signal SYNC and the system voltage VIN. In one embodiment, the output terminal LX is paralleled to an inductor and connected to a ground via an output capacitor, and a voltage of a node connecting the inductor and the output capacitor can be an output voltage of any one of the power converters, which is not limited thereto.

The second-stage power converter 202 is coupled to the processor 12 and one of the plurality of first-stage power converters 201, 203 and 204, and configured to generate a second output voltage V2 corresponding to a second switching frequency Fsw at the output terminal LX to the processor 12 according to the synchronous clock signal SYNC, a multiplied frequency control signal CTRL_fx and one of the plurality of first output voltages V11 (e.g., 5 volts), V12 (e.g., 3.3 volts), V13 (e.g., 1.8 volts), V14 (e.g., 1.2 volts), V15 (e.g., 1 volt), in which the second switching frequency Fsw is a multiple of the first switching frequency Fsync. Taking the first embodiment in FIG. 2 as an example, the second-stage power converter 202 is coupled to the processor 12 and the first-stage power converter 201, and configured to generate the second output voltage V2 corresponding to the second switching frequency Fsw according to the synchronous clock signal SYNC, the multiplied frequency control signal CTRL_fx and the first output voltage V11. In the embodiments of the present disclosure, the second-stage power converter 202 includes a multiplied frequency control circuit 21 configured to determine and adjust the second switching frequency Fsw according to the multiplied frequency control signal CTRL_fx, in which the multiplied frequency control signal CTRL_fx indicates a multiple between the second switching frequency Fsw and the first switching frequency Fsync. In one embodiment, the multiplied frequency control signal CTRL_fx may be an inter-integrated circuit bus ($I^2C$ bus) signal, a power management bus (PMBus) signal or a default signal. In one embodiment, the second-stage power converter 202 or the multiplied frequency control circuit 21 internally generates the multiplied frequency control signal CTRL_fx when the multiplied frequency control signal CTRL_fx is the default signal configured to preset the multiple between the second switching frequency Fsw and the first switching frequency Fsync (e.g., the multiple can be but is not limited to double or four times).

Under a two-stage power converter architecture of the synchronous power converter system 2, different power converters can operate with a proper switching frequency (e.g., the first switching frequency Fsync and the second switching frequency Fsw), such that the supplied voltage having proper characteristics can be provided to different elements in the computer system, so as to improve the overall performance of the computer system.

Figure 3:
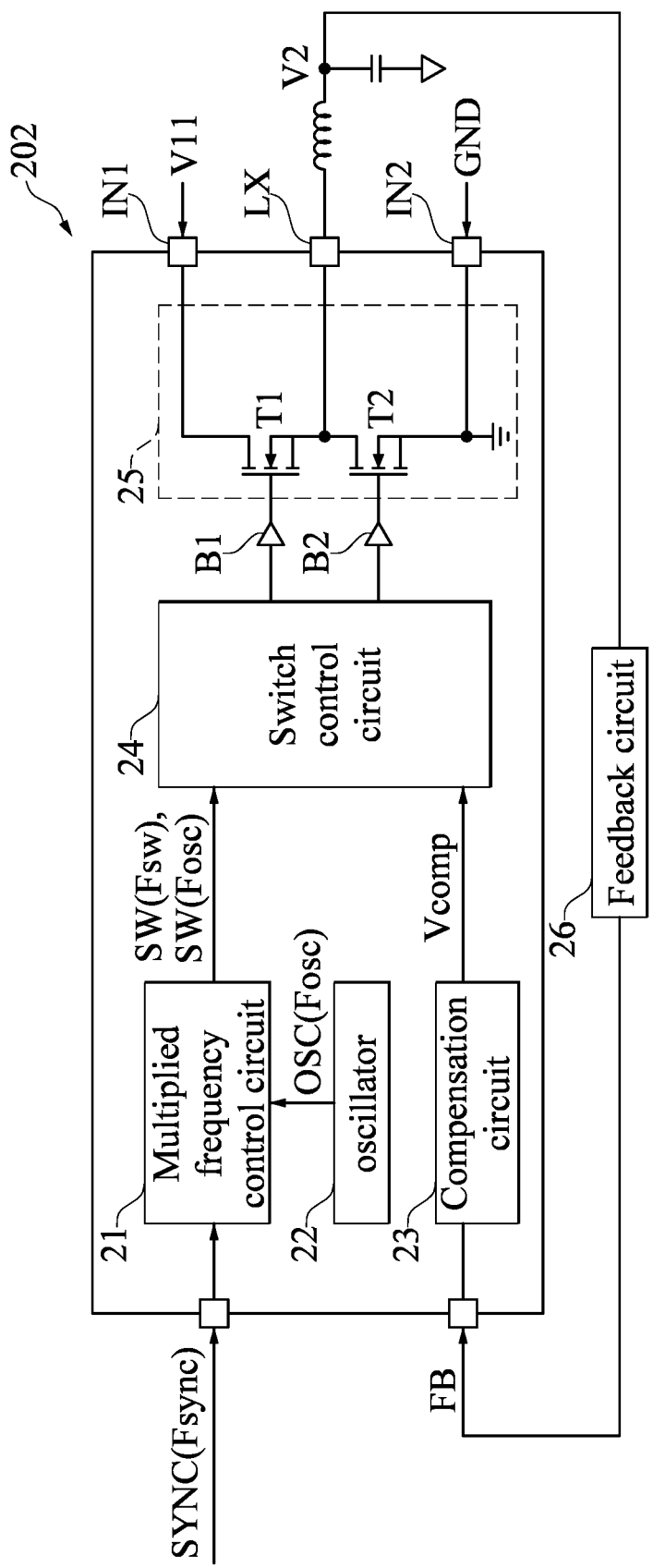
FIG. 3 is a functional block diagram of a second-stage power converter in FIG. 2 according to the first embodiment of the present disclosure.

FIG. 3 is a functional block diagram of the second-stage power converter 202 in FIG. 2 according to the first embodiment of the present disclosure. The second-stage power converter 202 includes the multiplied frequency control circuit 21, an oscillator 22, a compensation circuit 23, a switch control circuit 24, a switch circuit 25, a first buffer B1, a second buffer B2, a first input terminal IN1, a second input terminal IN2, and the output terminal LX.

The oscillator 22 is coupled to the multiplied frequency control circuit 21, and configured to generate an oscillating signal OSC corresponding to an oscillating switching frequency Fosc. The second switching frequency Fsw equals to the oscillating switching frequency Fosc when the synchronous clock signal SYNC is not received by the multiplied frequency control circuit 21, such that the multiplied frequency control circuit 21 outputs the switch control signal SW corresponding to the oscillating switching frequency Fosc.

The first input terminal IN1 is configured to receive one of the plurality of first output voltages V11, V12, V13, V14 and V15; in the embodiment of FIG. 3, the first input terminal IN1 is configured to receive the first output voltage V11, which is not limited. The second input terminal IN2 is coupled to a ground voltage GND. The output terminal LX is configured to output the second output voltage V2 to the processor 12.

The switch circuit 25 includes a first transistor T1 and a second transistor T2. The first transistor T1 includes a first terminal coupled to the first input terminal IN1, a second terminal coupled to the output terminal LX, and an input terminal coupled to an output terminal of the first buffer B1. The second transistor T2 includes a first terminal coupled to the output terminal LX, a second terminal coupled to the second input terminal IN2, and an input terminal coupled to an output terminal of the second buffer B2.

The compensation circuit 23 is coupled to the output terminal LX and the switch control circuit 24, and configured to generate a compensation signal Vcomp to the switch control circuit 24 according to a feedback signal FB. The switch control circuit 24 is coupled to the multiplied frequency control circuit 21, the compensation circuit 23, an input terminal of the first buffer B1 and an input terminal of the second buffer B2, and configured to control a turn-on state of the first transistor T1 via the first buffer B1 and a turn-on state of the second transistor T2 via the second buffer B2 according to the switch control signal SW corresponding to the second switching frequency Fsw and the compensation signal Vcomp, so as to generate the second output voltage V2 at the output terminal LX. In one embodiment, the second-stage power converter 202 further includes a feedback circuit 26 coupled between the output terminal LX and the compensation circuit 23, and configured to generate the feedback signal FB according to the second output voltage V2.

Figure 5:
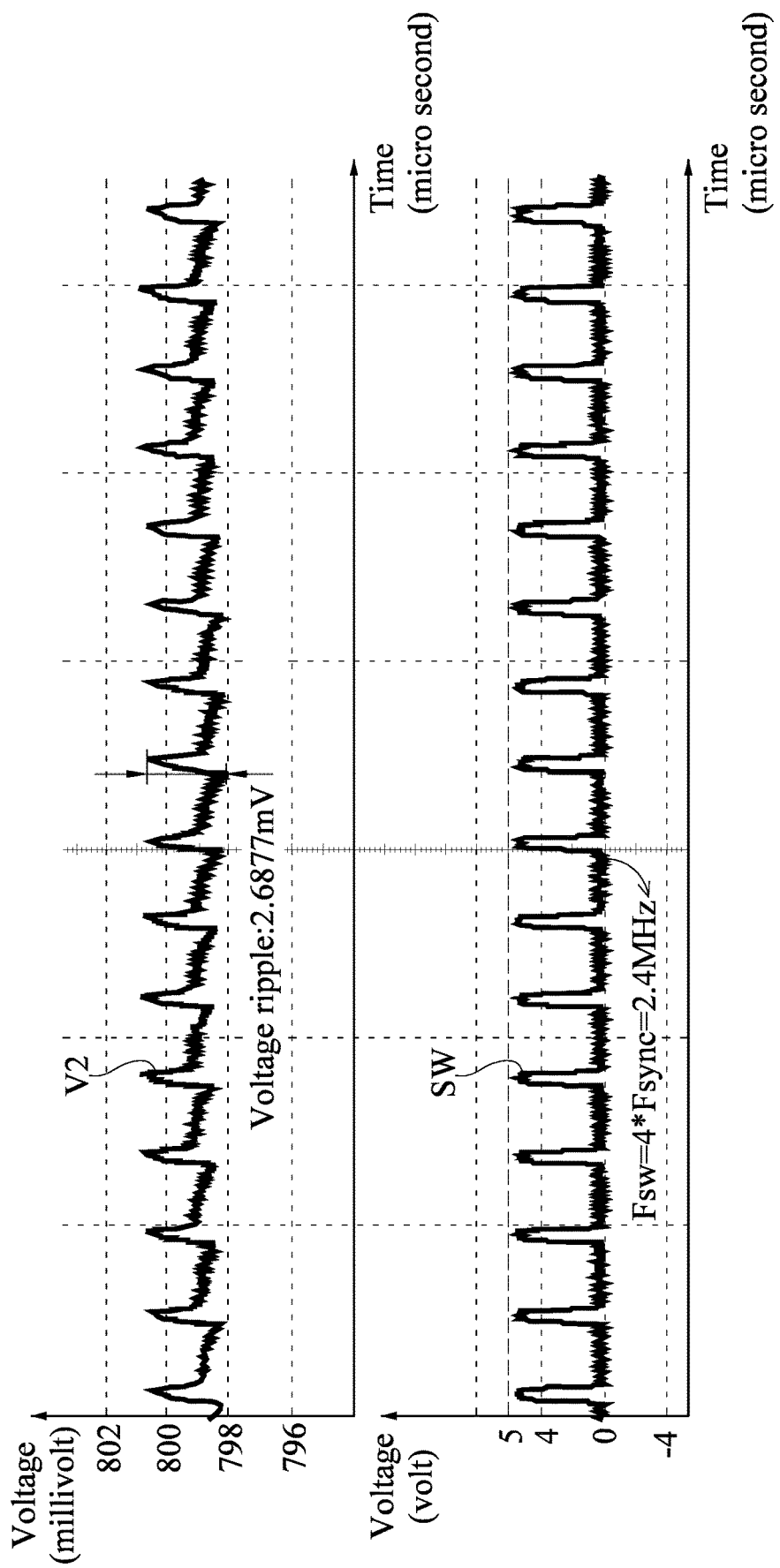
FIG. 5 is signal timing diagram of a switch control signal and a second output voltage of the second-stage power converter in FIG. 2 according to the first embodiment of the present disclosure.
Figure 6:
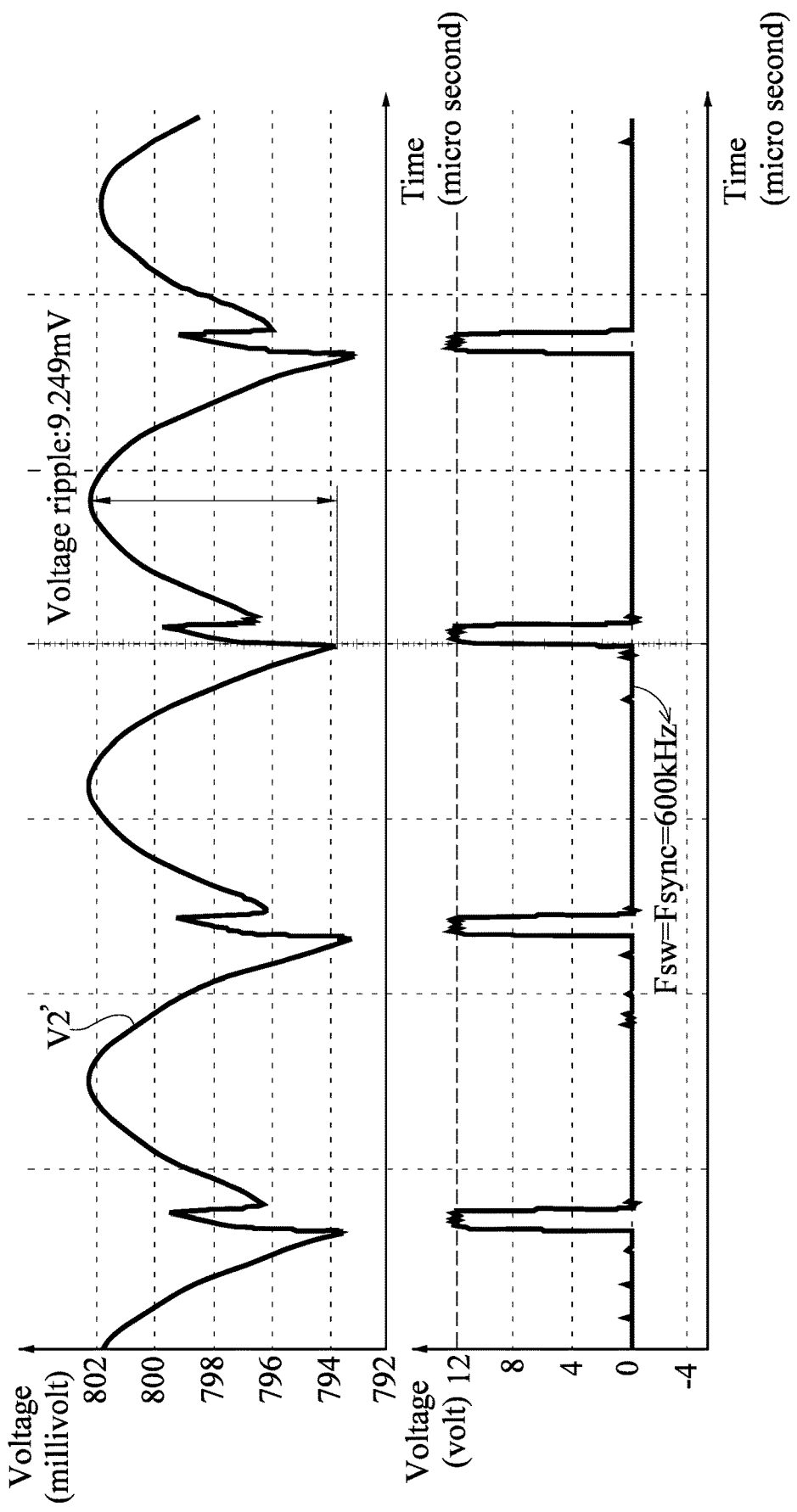
FIG. 6 is signal timing diagram of the switch control signal and the second output voltage of the power converter in FIG. 1.

In other words, by adding the multiplied frequency control circuit 21 in the second-stage power converter 202, the second-stage power converter 202 can determine the switching frequency (e.g., the first switching frequency Fsync, a multiple of the first switching frequency Fsync, or the oscillating switching frequency Fosc) corresponding to the switch control signal SW, thereby adjusting the characteristics (as shown in FIG. 5 and FIG. 6) of the second output voltage V2 that is generated by the second-stage power converter 202. Therefore, the processor 12 can operate in various performances to meet application requirements correspondingly.

Figure 4:
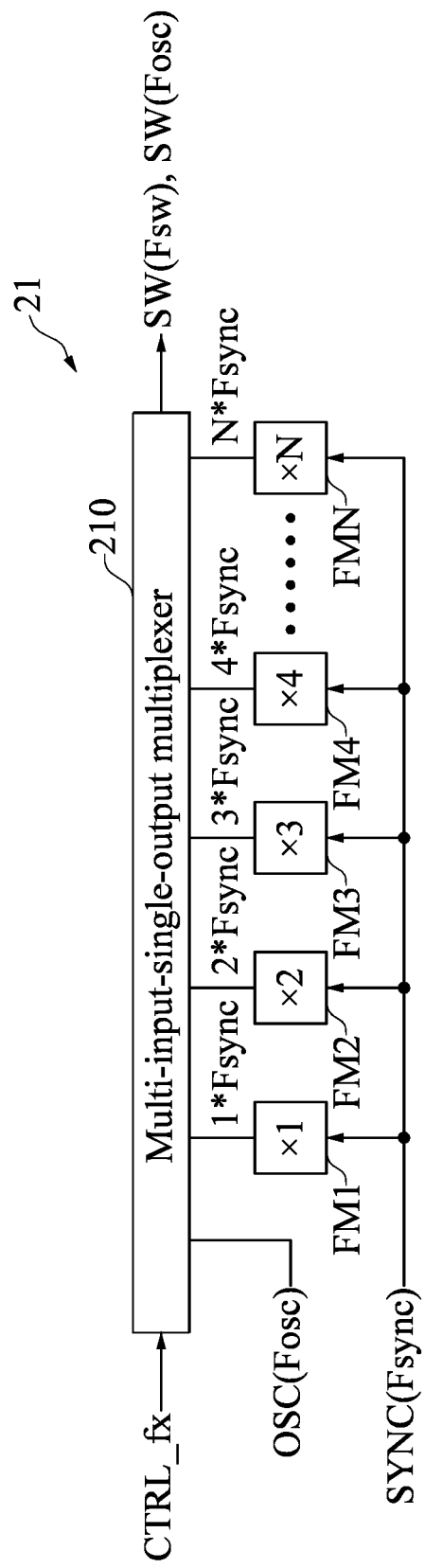
FIG. 4 is a functional block diagram of a multiplied frequency control circuit in FIG. 3 according to the first embodiment of the present disclosure.

FIG. 4 is a functional block diagram of the multiplied frequency control circuit 21 in FIG. 3 according to the first embodiment of the present disclosure. The multiplied frequency control circuit 21 includes a plurality of frequency multipliers FM1 to FMN and a multi-input-single-output multiplexer 210. The plurality of frequency multipliers FM1 to FMN are coupled to the processor 12 (not shown in FIG. 4), and configured to respectively multiply the synchronous clock signal SYNC corresponding to the first switching frequency Fsync by 1 to N times to generate N multiplied frequency clock signals 1*Fsync, 2*Fsync, . . . , and N*Fsync corresponding to 1 to N times of the first switching frequency Fsync, in which N is a positive integer greater than zero. The multi-input-single-output multiplexer 210 is coupled to the plurality of frequency multipliers FM1 to FMN, and configured to select one of the N multiplied frequency clock signals corresponding to 1 to N times of the first switching frequency Fsync according to the multiplied frequency control signal CTRL_fx, to output the switch control signal SW corresponding to the second switching frequency Fsw. For example, given that a typical switching frequency Fsync of the synchronous clock signal SYNC is 600 kHz and the switching frequency Fsw allowing the processor 12 to operate with favorable performance is 2.4 MHz, the multi-input-single-output multiplexer 210 may select the multiplied frequency clock signal 4*Fsync to output the switch control signal SW having the switching frequency being 2.4 MHz. As a result, by determining and adjusting the switching frequency Fsw of the voltage (i.e., the second voltage V2 shown in FIG. 2) supplied to the processor 12 through the multiplied frequency control circuit 21, the processor 12 can operate with favorable performance while operations of other elements in the computer system are unaffected.

FIG. 5 is a signal timing diagram of the switch control signal SW and the second output voltage V2 of the second-stage power converter 202 in FIG. 2 according to the first embodiment of the present disclosure. FIG. 6 is a signal timing diagram of the switch control signal SW and the second output voltage V2' of the power converter 102 in FIG. 1. In order to allow the processor 12 to operate with favorable performance, the voltage (i.e., the second voltage V2) supplied to the processor 12 should have characteristics of low voltage ripple, fast transient, etc. As can be learned by comparing FIG. 5 with FIG. 6, a voltage ripple of the second output voltage V2 of the present disclosure is substantially 2.6877 millivolts, which is smaller than that of the conventional second output voltage V2' being substantially 9.249 millivolts. In addition, a transient speed of the second output voltage V2 of the present disclosure is greater than that of the conventional second output voltage V2' (that is to say, the shorter the voltage transient time is, the faster the transient speed is). As a result, when the switch control signal SW of the second-stage power converter 202 of the present disclosure is adjusted to having the switching frequency being 2.4 MHz, compared with the conventional second output voltage V2', the second output voltage V2 provided to the processor 12 by the second-stage power converter 202 of the present disclosure has the characteristics of low voltage ripple and fast transient speed, so that the processor 12 can operate with favorable performance.

Second Embodiment

Figure 7:
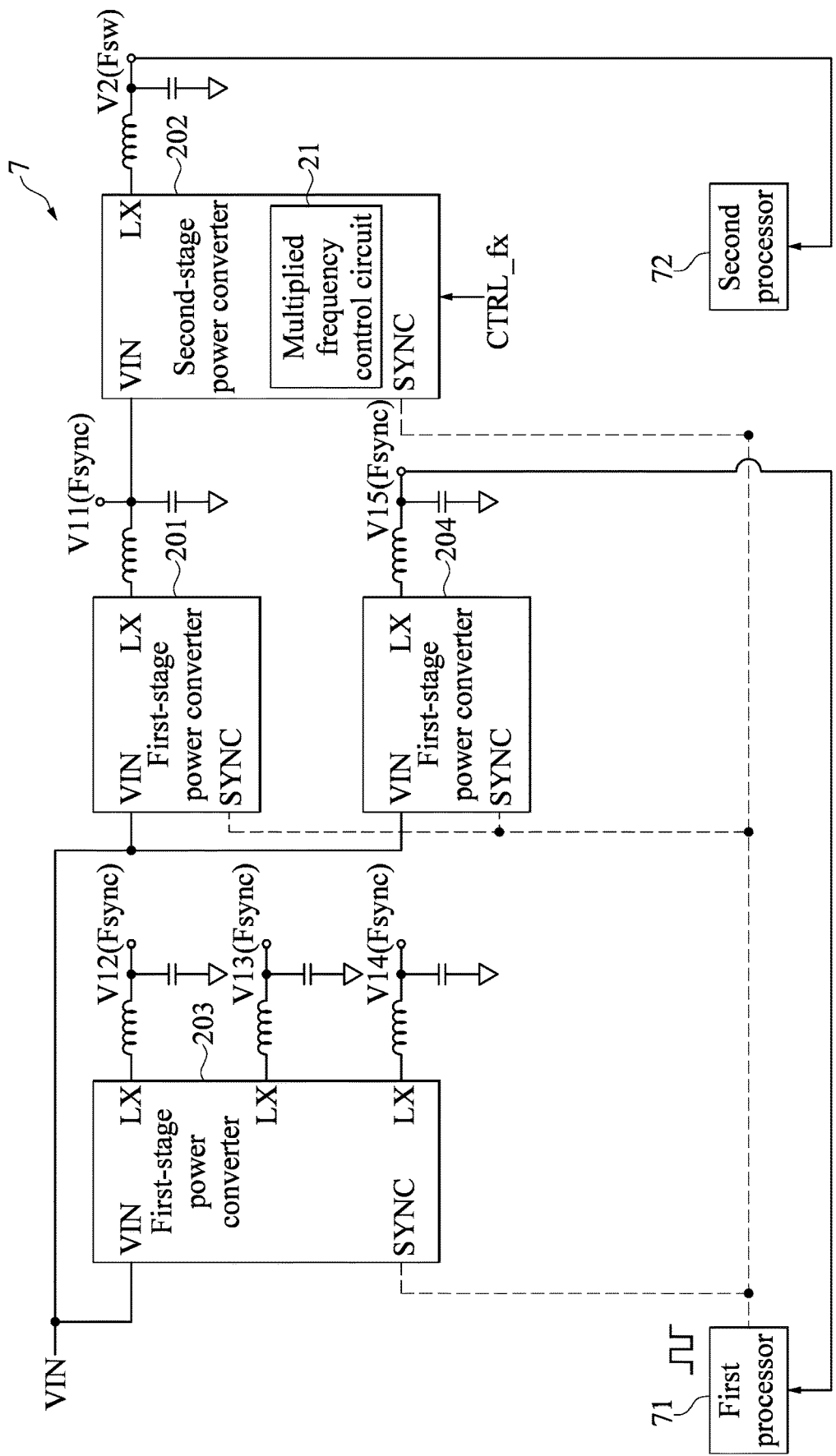
FIG. 7 is a functional block diagram of a synchronous power converter system according to a second embodiment of the present disclosure.

FIG. 7 is a functional block diagram of a synchronous power converter system 7 according to a second embodiment of the present disclosure. The synchronous power converter system 7 may be utilized in a computer system including a plurality of processors, such as but not limited to dual processors. Taking the computer system including dual processors as an example, the synchronous power converter system 7 includes a first processor 71, a second processor 72, a plurality of first-stage power converters 201, 203 and 204 and at least one second-stage power converter 202. The synchronous power converter system 7 is configured to supply power to the first processor 71 and the second processor 72, respectively. Specifically, the first-stage power converter 204 is coupled to the first processor 71, and configured to generate the first output voltage V15 (e.g., 1 volt) corresponding to the first switching frequency Fsync at the output terminal LX according to the synchronous clock signal SYNC and the system voltage VIN to the first processor 71. The second-stage power converter 202 is coupled to the second processor 72, and configured to generate the second output voltage V2 corresponding to the second switching frequency Fsw according to the synchronous clock signal SYNC, the multiplied frequency control signal CTRL_fx and the first output voltage V11, in which the second switching frequency Fsw may be the first switching frequency Fsync, a multiple of the first switching frequency Fsync or the oscillating switching frequency Fosc. In one embodiment, the first processor 71 may be a processor configured to process data from wired circuits in the computer system (e.g., image, voice, user interface, wired input and output interface, etc.), while the second processor 72 may be a processor configured to process data from wireless circuits in the computer system (e.g., WI-FI®, BLUETOOTH®, fourth generation mobile communication system, etc.). Since the abovementioned computer system for wireless communication uses radio-frequency signals having frequencies higher than a megahertz level, the second output voltage V2 supplied to the second processor 72 by the second-stage power converter 202 has the characteristics of low voltage ripple and fast transient when the switch control signal SW of the second-stage power converter 202 is adjusted to have the switching frequency being 2.4 MHz, which allows the second processor 72 to operate with favorable performance to provide a better user experience.

As can be learned from the first embodiment and the second embodiment, the second-stage power converter 202 generates the output voltage V2 corresponding to the second switching frequency Fsw to at least one of the first processor 71 (or the processor 12 in FIG. 2) and the second processor 72. In other embodiments, the synchronous power converter system of the present disclosure includes a plurality of second-stage power converters configured to generate a plurality of output voltages corresponding to a plurality of switching frequencies Fsw to a plurality of processors, respectively.

Figure 8:
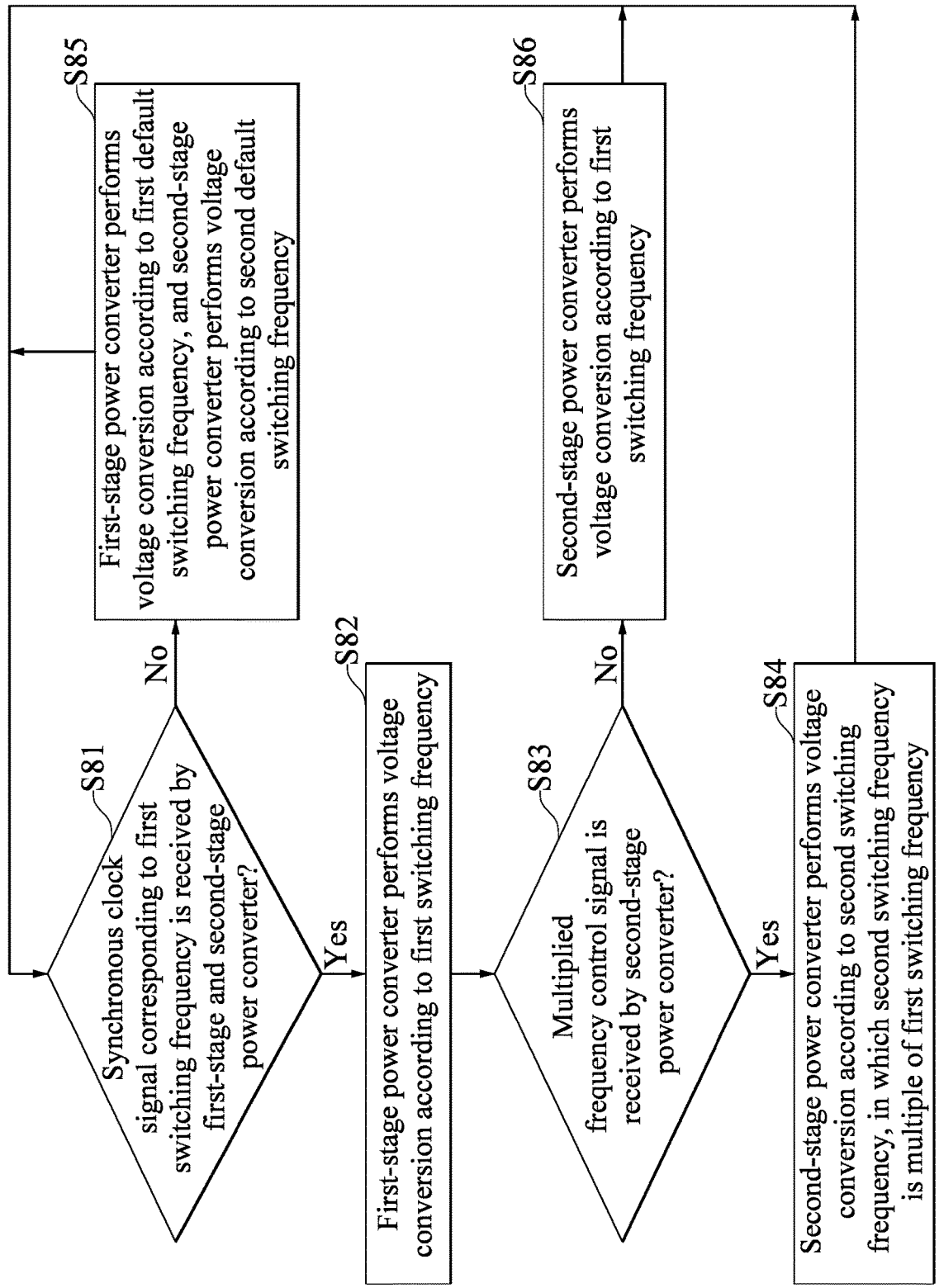
FIG. 8 is a flowchart of a process of determining switching frequency according to the first and second embodiments of the present disclosure.

Operations of the synchronous power converter systems 2 and 7 can be summarized into a process of determining a switching frequency, as shown in FIG. 8, the process in FIG. 8 includes the following steps.

Step S81: Determining whether or not a synchronous clock signal corresponding to a first switching frequency is received by first-stage and second-stage power converters; if yes, performing Step S82, if no, performing Step S85.

Step S82: The first-stage power converter performs voltage conversion according to the first switching frequency.

Step S83: Determining whether or not a multiplied frequency control signal is received by the second-stage power converter; if yes, performing Step S84, if no, performing Step S86.

Step S84: The second-stage power converter performs voltage conversion according to a second switching frequency, in which the second switching frequency is a multiple of the first switching frequency, then, return to Step S81.

Step S85: The first-stage power converter performs voltage conversion according to a first default switching frequency, and the second-stage power converter performs voltage conversion according to a second default switching frequency, then, return to Step S81.

Step S86: The second-stage power converter performs voltage conversion according to the first switching frequency, then, return to Step S81.

Detailed description regarding the process in FIG. 8 can be obtained by referring to the embodiments in FIG. 2 to FIG. 5 and FIG. 7, and will not be reiterated herein.

Beneficial Effects of the Embodiments

Therefore, by virtue of a "two-stage power conversion architecture", the power converter can operate with a proper switching frequency (e.g., a first switching frequency or a second switching frequency), such that a supplied voltage having proper characteristics can be provided to different elements in a computer system, so as to improve an overall performance of the computer system.

Further, by virtue of "adding a multiplied frequency control circuit in second-stage power converter", the second-stage power converter can determine a switching frequency (e.g., the first switching frequency Fsync, a multiple of the first switching frequency Fsync, or the oscillating switching frequency Fosc) corresponding to a switch control signal, thereby adjusting characteristics of the supplied voltage that is generated by the second-stage power converter, so the processor can operate in various performances to meet application requirements correspondingly.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A synchronous power converter system, comprising:
   a first processor configured to output a synchronous clock signal corresponding to a first switching frequency;
   a plurality of first-stage power converter coupled to the first processor, and configured to generate a plurality of first output voltages corresponding to the first switching frequency according to the synchronous clock signal and a system voltage; and
   at least one second-stage power converter coupled to the first processor and one of the plurality of first-stage power converters, and configured to generate a second output voltage corresponding to a second switching frequency according to the synchronous clock signal, a multiplied frequency control signal and one of the plurality of first output voltages;
   wherein the second switching frequency is a multiple of the first switching frequency.

2. The synchronous power converter system according to claim 1, wherein the at least one second-stage power converter includes a multiplied frequency control circuit, the multiplied frequency control circuit including:
   a plurality of frequency multipliers coupled to the first processor, and configured to respectively multiply the synchronous clock signal corresponding to the first switching frequency by 1 to N times to generate N multiplied frequency clock signals corresponding to 1 to N times of the first switching frequency, wherein N is a positive integer greater than zero; and
   a multi-input-single-output multiplexer coupled to the plurality of frequency multipliers, and configured to select one of the N multiplied frequency clock signals corresponding to the 1 to N times of the first switching frequency according to the multiplied frequency control signal, to output a switch control signal corresponding to the second switching frequency;
   wherein the multiplied frequency control signal indicates a multiple between the second switching frequency and the first switching frequency, and the multiplied frequency control signal is an inter-integrated circuit bus signal, a power management bus signal, or a default signal.

3. The synchronous power converter system according to claim 2, wherein the at least one second-stage power converter further includes:
   an oscillator coupled to the multiplied frequency control circuit, and configured to generate an oscillating signal corresponding to an oscillating switching frequency;
   wherein the second switching frequency equals to the oscillating switching frequency when the synchronous clock signal is not received by the multiplied frequency control circuit, such that the multiplied frequency control circuit outputs the switch control signal corresponding to the oscillating switching frequency.

4. The synchronous power converter system according to claim 2, wherein the at least one second-stage power converter further includes:
   a first input terminal configured to receive one of the plurality of first output voltage;
   a second input terminal coupled to a ground voltage;
   an output terminal configured to output the second output voltage;
   a switch circuit including:
      a first transistor including:
         a first terminal coupled to the first input terminal;
         a second terminal coupled to the output terminal; and
         an input terminal; and
      a second transistor including:
         a first terminal coupled to the output terminal;
         a second terminal coupled to the second input terminal; and
         an input terminal;
   a first buffer including:
      an input terminal; and
      an output terminal coupled to the input terminal of the first transistor;
   a second buffer including:
      an input terminal; and
      an output terminal coupled to the input terminal of the second transistor;
   a compensation circuit coupled to the output terminal, and configured to generate a compensation signal according to a feedback signal; and
   a switch control circuit coupled to the multiplied frequency control circuit, the compensation circuit, and the input terminal of the first buffer, and configured to control a turn-on state of the first transistor via the first buffer and a turn-on state of the second transistor via the second buffer according to the switch control signal and the compensation signal, so as to generate the second output voltage at the output terminal.

5. The synchronous power converter system according to claim 4, wherein the at least one second-stage power converter further includes a feedback circuit, the feedback circuit being coupled between the output terminal and the compensation circuit, and the feedback circuit being configured to generate the feedback signal according to the second output voltage.

6. The synchronous power converter system according to claim 1, wherein the at least one second-stage power converter is configured to generate the second output voltage corresponding to the second switching frequency to the first processor.

7. The synchronous power converter system according to claim 1, further comprising:
a second processor coupled to the at least one second-stage power converter; wherein one of the plurality of first-stage power converters is configured to generate one of the plurality of first output voltages corresponding to the first switching frequency to the first processor, and the at least one second-stage power converter is configured to generate the second output voltage corresponding to the second switching frequency to the second processor.

8. A power converter utilized in a synchronous power converter system including a first processor, the first processor being configured to output a synchronous clock signal corresponding to a first switching frequency, comprising:
a multiplied frequency control circuit configured to generate a switch control signal corresponding to a second switching frequency according to a multiplied frequency control signal and the synchronous clock signal, wherein the multiplied frequency control signal indicates a multiple between the second switching frequency and the first switching frequency; and
a switch control circuit coupled to the multiplied frequency control circuit, and configured to control the power converter to generate an output voltage corresponding to the second switching frequency according to the switch control signal.

9. The power converter according to claim 8, wherein the multiplied frequency control circuit includes:
a plurality of frequency multipliers coupled to the first processor, and configured to respectively multiply the synchronous clock signal corresponding to the first switching frequency by 1 to N times to generate N multiplied frequency clock signals corresponding to 1 to N times of the first switching frequency, wherein N is a positive integer greater than zero; and
a multi-input-single-output multiplexer coupled to the plurality of frequency multipliers, and configured to select one of the N multiplied frequency clock signals corresponding to the 1 to N times of the first switching frequency according to the multiplied frequency control signal, to output the switch control signal corresponding to the second switching frequency;
wherein the multiplied frequency control signal is an inter-integrated circuit bus signal, a power management bus signal, or a default signal.

10. The power converter according to claim 8, wherein the synchronous power converter system includes:
a second processor coupled to the first processor, wherein the power converter generates the output voltage corresponding to the second switching frequency to at least one of the first processor and the second processor.

11. The power converter according to claim 8, further comprising:
an oscillator coupled to the multiplied frequency control circuit, and configured to generate an oscillating signal corresponding to an oscillating switching frequency;
wherein the second switching frequency equals to the oscillating switching frequency when the synchronous clock signal is not received by the multiplied frequency control circuit, such that the multiplied frequency control circuit outputs the switch control signal corresponding to the oscillating switching frequency.

12. A method of determining a switching frequency, utilized in a synchronous power converter system including a first-stage power converter and at least one second-stage power converter, comprising:
determining whether or not a synchronous clock signal corresponding to a first switching frequency is received by the first-stage power converter and the at least one second-stage power converter;
determining whether or not a multiplied frequency control signal indicating a multiple between a second switching frequency and the first switching frequency is received by the at least one second-stage power converter when the synchronous clock signal is received by the first-stage power converter and the at least one second-stage power converter; and
performing voltage conversion by the at least one second-stage power converter according to the second switching frequency when the multiplied frequency control signal is received by the at least one second-stage power converter; wherein the second switching frequency is a multiple of the first switching frequency.

13. The method according to claim 12, wherein, when the synchronous clock signal is received by the first-stage power converter and the at least one second-stage power converter, the method further comprises:
performing voltage conversion by the first-stage power converter according to the first switching frequency.

14. The method according to claim 13, wherein the first-stage power converter performs voltage conversion according to a system voltage of the synchronous power converter system and the first switching frequency to generate a first output voltage; and wherein the at least one second-stage power converter performs voltage conversion according to the first output voltage and one of the first switching frequency, the second switching frequency and a second default switching frequency to generate a second output voltage.

15. The method according to claim 12, wherein, when the synchronous clock signal is not received by the first-stage power converter and the at least one second-stage power converter, the method further comprises:
performing voltage conversion, by the first-stage power converter, according to a first default switching frequency, and performing voltage conversion by the at least one second-stage power converter according to a second default switching frequency.

16. The method according to claim 12, wherein, when the synchronous clock signal is received by the first-stage power converter and the at least one second-stage power converter, and the multiplied frequency control signal is not received by the at least one second-stage power converter, the method further comprises:
performing voltage conversion, by the at least one second-stage power converter, according to the first switching frequency.

* * * * *